US012568051B2

(12) United States Patent
Roberts et al.

(10) Patent No.: US 12,568,051 B2
(45) Date of Patent: Mar. 3, 2026

(54) METHOD OF MANAGING DATA TRANSMISSION FOR ENSURING PER-FLOW FAIR BANDWIDTH SHARING

(71) Applicant: Huawei Technologies Co., Ltd., Shenzhen (CN)

(72) Inventors: James Walter Roberts, Boulogne Billancourt (FR); Dario Rossi, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 485 days.

(21) Appl. No.: 18/149,809

(22) Filed: Jan. 4, 2023

(65) Prior Publication Data

US 2023/0216805 A1 Jul. 6, 2023

Related U.S. Application Data

(63) Continuation of application No. PCT/EP2020/080037, filed on Oct. 26, 2020.

(51) Int. Cl.
*H04L 47/10* (2022.01)
*H04L 47/62* (2022.01)

(52) U.S. Cl.
CPC .......... *H04L 47/39* (2013.01); *H04L 47/6215* (2013.01)

(58) Field of Classification Search
CPC ............................ H04L 47/39; H04L 47/6215
See application file for complete search history.

(56) References Cited

U.S. PATENT DOCUMENTS

| | | | | |
|---|---|---|---|---|
| 6,985,442 B1* | 1/2006 | Wang | ...................... | H04L 47/30 |
| | | | | 370/232 |
| 8,274,896 B2* | 9/2012 | Lakshmikantha | ...... | H04L 47/10 |
| | | | | 370/428 |
| 2003/0099199 A1* | 5/2003 | Kiremidjian | ............ | H04L 47/39 |
| | | | | 370/230.1 |
| 2011/0194426 A1* | 8/2011 | Fang | ...................... | H04L 47/20 |
| | | | | 370/252 |

(Continued)

OTHER PUBLICATIONS

V. Addanki, et al, "Controlling software router resource sharing by fair packet dropping," IFIP Networking Conference (IFIP Networking) and Workshops, Zurich, Switzerland, May 14, 2018, 9 pages.

(Continued)

*Primary Examiner* — Melanie Jagannathan
(74) *Attorney, Agent, or Firm* — Conley Rose, P.C.

(57) ABSTRACT

A computer-implementation method includes receiving a data packet; identifying a virtual queue from a list of virtual queues to which the data packet pertains; and determining whether the identified virtual queue size exceeds a threshold maximum size. When the first size does not exceed the threshold maximum size, the identified virtual queue is increased based on a size of the data packet and the data packet is forwarded. The method further includes setting a virtual queue from the list of virtual queues as a target queue; determining a service capacity based on an update time interval and increasing a credit allowance based on the service capacity. The target queue is reduced by an amount based on the credit allowance size, and the credit allowance is reduced by the same amount.

20 Claims, 7 Drawing Sheets

100

(56) References Cited

U.S. PATENT DOCUMENTS

| | | | | |
|---|---|---|---|---|
| 2015/0350113 | A1* | 12/2015 | Chen | H04L 47/27 |
| | | | | 370/345 |
| 2017/0187641 | A1* | 6/2017 | Lundqvist | H04L 43/0888 |
| 2018/0287953 | A1* | 10/2018 | Cheng | H04L 49/9036 |
| 2018/0302328 | A1* | 10/2018 | Keith | H04L 47/24 |
| 2020/0153748 | A1* | 5/2020 | Pan | H04L 47/26 |
| 2023/0142425 | A1* | 5/2023 | Nádas | H04L 47/31 |
| | | | | 370/412 |

OTHER PUBLICATIONS

K. Ramakrishnan et al. "The Addition of Explicit Congestion Notification (ECN) to IP," RFC 3168, Sep. 2001, 63 pages.
Y. Lu, et al., "SDN-based TCP Congestion Control in Data Center Networks," Proceedings of IEEE IPCCC, 2015, 7 pages.
A. Abdelmoniem, et al., "Reconciling Mice and Elephants in Data Center Networks," IEEE 4th International Conference on Cloud Networking (CloudNet), 2015, 6 pages.
P. Goyal, et al., "Backpressure Flow Control," Proc. Workshop Buffer Sizing, Dec. 2019, 27 pages.
Y. Li, et al., "HPCC: High precision congestion control," In Proceedings of the ACM SIGCOMM, Aug. 19-23, 2019, 15 pages.
R. Pan, et al., "Approximate Fairness through Differential Dropping," ACM SIGCOMM Computer Communications Review, vol. 33, No. 2, 2003, 17 pages.
N. K. Sharma, et al., "Approximating Fair Queueing on Reconfigurable Switches," In Proceedings of the 15th Usenix Conference on Networked Systems Design and Implementation, NSDI '18, Apr. 9-11, 2018, 17 pages.
P. Goyal, et al., Start-Time Fair Queueing: A Scheduling Algorithm for Integrated Services Packet Switching Networks, IEEE/ACM Transactions on Networking, vol. 5, No. 5, Oct. 1997, 15 pages.
M. Shreedhar, et al., "Efficient Fair Queueing Using Deficit Round-Robin," IEEE/ACM Transactions on Networking, vol. 4, No. 3, Jun. 1996, 11 pages.
"Huawei AI fabric Intelligent Lossless Data Center Network Solution," Test Report, Tolly, #219118, Mar. 2019, 9 pages.

* cited by examiner

DATA
PACKET
RECIEVING
MODULE
202

VIRTUAL
QUEUE
IDENTIFYING
MODULE
204

DATA PACKET
FORWARDING
MODULE
206

SERVICE
CAPACITY
DETERMINING
MODULE
210

TARGET QUEUE
SETTING
MODULE
208

TARGET QUEUE AND
CREDIT ALLOWANCE
REDUCING MODULE
212

102

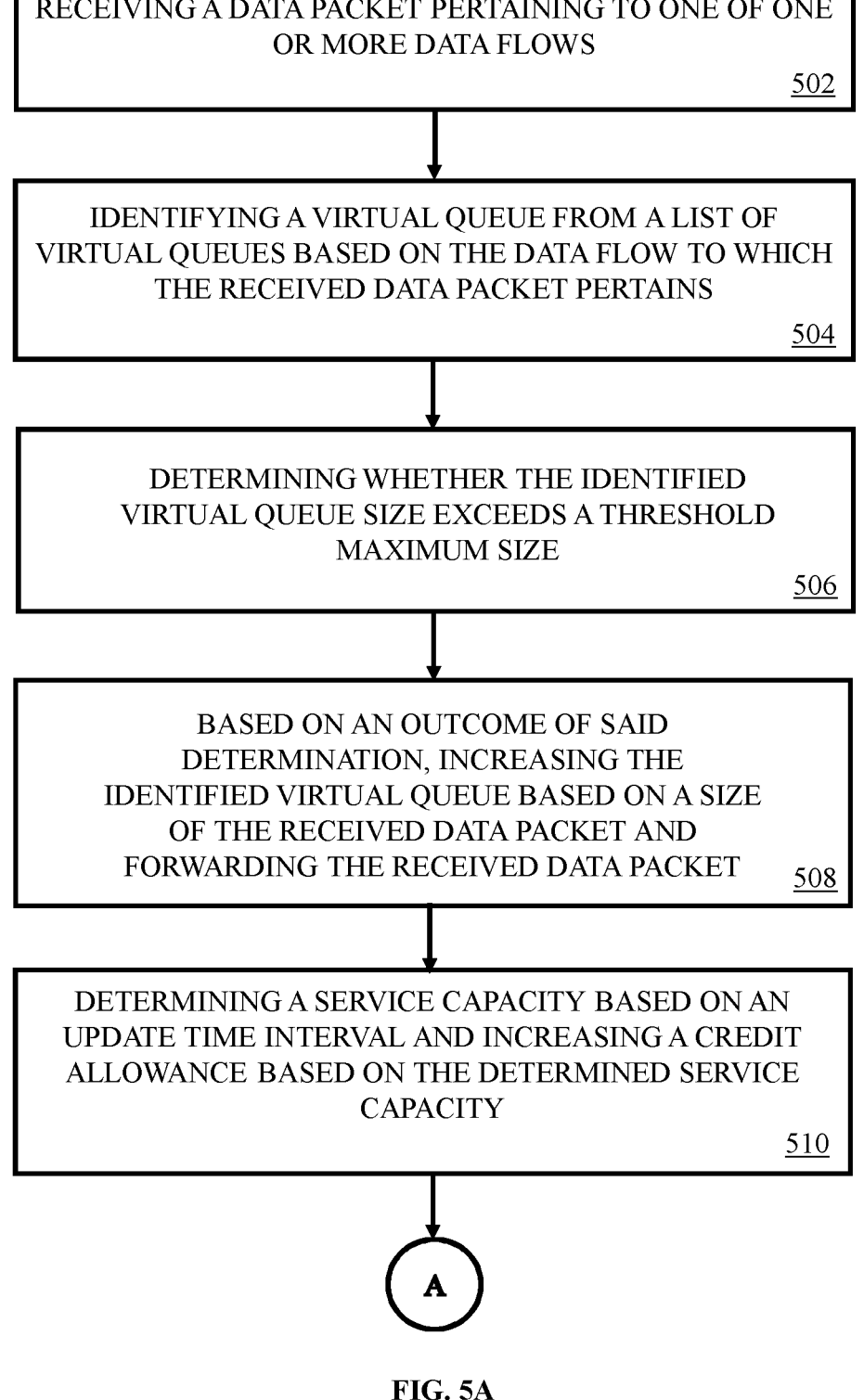

RECEIVING A DATA PACKET PERTAINING TO ONE OF ONE OR MORE DATA FLOWS

502

IDENTIFYING A VIRTUAL QUEUE FROM A LIST OF VIRTUAL QUEUES BASED ON THE DATA FLOW TO WHICH THE RECEIVED DATA PACKET PERTAINS

504

DETERMINING WHETHER THE IDENTIFIED VIRTUAL QUEUE SIZE EXCEEDS A THRESHOLD MAXIMUM SIZE

506

BASED ON AN OUTCOME OF SAID DETERMINATION, INCREASING THE IDENTIFIED VIRTUAL QUEUE BASED ON A SIZE OF THE RECEIVED DATA PACKET AND FORWARDING THE RECEIVED DATA PACKET

508

DETERMINING A SERVICE CAPACITY BASED ON AN UPDATE TIME INTERVAL AND INCREASING A CREDIT ALLOWANCE BASED ON THE DETERMINED SERVICE CAPACITY

METHOD OF MANAGING DATA TRANSMISSION FOR ENSURING PER-FLOW FAIR BANDWIDTH SHARING

CROSS-REFERENCE TO RELATED APPLICATIONS

This is a continuation of International Patent Application No. PCT/EP2020/080037 filed on Oct. 26, 2020, which is hereby incorporated by reference in its entirety.

TECHNICAL FIELD

The present disclosure relates generally to data transmission, and more particularly, the present disclosure relates to a computer-implemented method of managing data transmission for enforcing fair sharing of bandwidth in a network. Moreover, the present disclosure relates to a computing device that is configured to manage data transmission.

BACKGROUND

Data transmission refers to the process of transferring data between two or more devices. The importance of a fair sharing of bandwidth between concurrent flows is increasingly recognized, especially in a context of data center networks. Data flows in the data center networks may saturate link bandwidth, especially, the link bandwidth between servers and their top-of-rack (ToR) switch. The manner in which link bandwidth is shared significantly impacts a performance of concurrent flows. In recent times, fair sharing of bandwidth is also gaining importance in the Internet core where links are increasingly used by flows that transfer voluminous content at high speed between remote servers, e.g. to fill content provider caches in Internet service provider (ISP) point of presence (PoPs). The presence of such flows makes it desirable to fairly share bandwidth and thus preserve the performance of concurrent flows requiring low packet latency. Furthermore, an introduction of more aggressive congestion control protocols such as Bottleneck Bandwidth and Round-trip propagation time (BBR) is making it inadequate to rely on an end-system for fair sharing at the bottleneck bandwidth.

Fair sharing of bandwidth between 5-tuple flows is a classical issue in Internet Protocol (IP) networking. Numerous methods have been proposed for realizing per-flow fair sharing at a local level and an end-to-end level. In the local level method, classical fair queuing schedulers such as Deficit Round Robin (DRR) and Start Time Fair Queuing (STFQ) may be used to control sharing between a small number of broadly defined traffic classes, but not for the 5-tuple flows. Furthermore, the classical fair queuing schedulers typically require one physical queue per-flow and have not been implemented on the Internet or the data center networks for per-flow fair bandwidth sharing. One such existing approach that enforces fair bandwidth sharing at the local level uses a small group of first in, first out (FIFO) queues per output. However, the FIFO queues are not dedicated to flows but are used rather to classify data packets according to their programmed departure time. Further, the implementation of this approach is complex, notably for the "rotating strict priority scheduler" and the calculation of "round numbers". Another existing approach enforces fair bandwidth sharing in the context of a lossless data center network using remote direct memory access (RDMA). This existing approach implements a fair scheduler that dynamically assigns active flows to a small number of output queues allowing incoming traffic to be paused as necessary at flow granularity.

Also, the fair bandwidth sharing can be realized using end-to-end congestion control implemented by an end-to-end transport protocol. In an existing approach, a high precision congestion control (HPCC) algorithm is used to solve the lossless data center network bandwidth sharing problem. It imposes a simple switch algorithm for marking packets with congestion indications including the current queue length and the amount of transmitted traffic. However, the HPCC requires a complex end-system algorithm to calculate the data flow rate. In another existing approach, a virtual fair scheduler is used to track occupancies of per-flow virtual queues realized as byte counters. However, the virtual fair scheduler has a limitation as all byte counters for active flows need to be frequently updated to distribute credits in an exact manner, which is prohibitive in current switches at data centers. This exact fairness method has been used to enforce fair bandwidth sharing, however, it works only for software routers equipped with a powerful central processing unit (CPU). The exact fairness method is too complex to be applied in modern switches equipped with pipelines of match-action tables that have a limited range of feasible operations.

Alternatively, flow-control headers (receive window (rwnd), advertised in the packet header by the receiving endpoint) can be used as a means to control the sending rate of non-cooperative hosts (in addition to congestion window (cwnd), computed by the sender) since Transmission Control Protocol (TCP) sources send at most w=min (cwnd, rwnd) packets per round trip time. Similarly, a method that rewrites the rwnd of acknowledgment (ACK) packets alleviates the incast problem in the data center networks. None of the existing end-to-end congestion control methods consider the coexistence of multiple types of traffic, and the multiple types of data flows are thus equally treated.

Existing approaches require a complex computation, or their implementation is difficult or is not implementable in switch architectures. The existing approaches may also require significantly more complex hardware. Therefore, there arises a need to address the aforementioned technical drawbacks in existing technologies to ensure per-flow fair bandwidth sharing for data congestion control.

SUMMARY

It is an object of the present disclosure to provide a method of managing data transmission for ensuring per-flow fairness to achieve congestion control of bandwidth in a network.

This object is achieved by features of the independent claims. Further implementation forms are apparent from the dependent claims, the description, and the figures.

The present disclosure provides a method of managing data transmission and a computing device to execute the method of managing data transmission.

According to a first aspect, there is provided a computer-implemented method of managing data transmission. The method includes receiving, by a processor, a data packet pertaining to one of a plurality of data flows. The method includes identifying, by the processor, a virtual queue from a list of virtual queues based on the data flow to which the received data packet pertains. The method includes determining, by the processor, whether the identified virtual queue size exceeds a threshold maximum size. Based on an outcome of said determination, the method includes increasing the identified virtual queue based on a size of the received data packet and forwarding the received data packet. The method includes setting, by the processor, a virtual queue from the list of virtual queues as a target queue. The method includes determining, by the processor, a service capacity based on an update time interval and increasing a credit allowance based on the determined service capacity. The method includes reducing, by the processor, the target queue by an amount based on the credit allowance size, and reducing the credit allowance by the same amount.

The present method has an advantage in achieving approximate fair bandwidth sharing that is close to exact fairness without involving complex algorithms, by (i) increasing only a state (i.e., flow data) of a single virtual queue at each arrival of a data packet, and (ii) reducing only a single virtual queue at a sequence of bandwidth allocation instants that may or may not coincide with the data packet arrival. The method enables a hardware/programmable switch to fairly share bandwidth of the network between data flows in an output, irrespective of the data flow demand in an input. The method provides approximate fair bandwidth sharing by allocating all available bandwidth to a single virtual queue at each allocation instant.

The method employs a simple computation for determining a difference between an identified virtual queue size and a threshold maximum queue size. The method helps in limiting an amount of the state that needs to be modified at the arrival of each data packet for enforcing the fair bandwidth sharing. The method can be implemented on a range of programmable switches including high-speed programmable switches, for different domains of applications (e.g., data center, ISP). The method enables approximate fair bandwidth sharing in network devices. The method enables fair bandwidth sharing by combining a local method and end-to-end methods. The method, in the end to end method, adapts an enforcing decision to specifics of traffic and application scenarios, with an ability to combine a set of enforcement rules, when combined with the local method, thereby retaining robustness in the presence of a mixture of different types of data flows.

In a first possible implementation form of the method of managing data transmission of the first aspect, the received data packet is not forwarded and the identified virtual queue is not increased based on the size of the received data packet, if it is determined that the virtual queue size exceeds the threshold maximum size. The method can enforce approximate fair bandwidth sharing at the local level by not forwarding the received data packet. In such an implementation form, the received data packet is dropped or discarded, rather than being forwarded. The method is interoperable as the method can be used in conjunction with end-to-end methods tailored for cooperative sources with implicit or explicit signalling or non-cooperative sources with either local or remote enforcement.

In a second possible implementation form of the method of the first aspect, a notification of network congestion is added to a header of the received data packet before the received data packet is forwarded, if it is determined that the virtual queue size exceeds the threshold maximum size.

In a third possible implementation form of the method of managing data transmission of the first aspect as such or according to any of the preceding implementation forms, identifying the virtual queue includes adding a new virtual queue to the list of virtual queues, if the list of virtual queues does not include a virtual queue corresponding to the data flow to which the received data packet corresponds.

In a fourth possible implementation form of the method of managing data transmission of the first aspect as such or according to any of the preceding implementation forms, forwarding the received data packet includes forwarding to a physical FIFO queue for transmission.

In a fifth possible implementation form of the method of managing data transmission of the first aspect as such or according to any of the preceding implementation forms, forwarding the received data packet includes determining whether the identified virtual queue size exceeds a threshold minimum size, and forwarding the data packet to a priority FIFO queue for transmission if the identified virtual queue size does not exceed the threshold minimum size.

In a sixth possible implementation form of the method of managing data transmission of the first aspect as such or according to the first possible implementation form of the method of the first aspect to the third possible implementation form of the method of the first aspect, receiving the data packet includes receiving from a physical FIFO queue, and forwarding the received data packet includes forwarding to an output port for transmission.

The method enables the enforcement of per-data flow fair bandwidth sharing in programmable/hardware switches and routers.

In a seventh possible implementation form of the method of managing data transmission of the sixth possible implementation form of the first aspect, the update time interval is an elapsed time interval between a timestamp of a previous data packet and a timestamp of the data packet. The timestamps of the data packets are based on a respective time of ingress into the physical FIFO queue.

In an eighth possible implementation form of the method of managing data transmission of the sixth possible implementation form or the seventh possible implementation form of the first aspect, the method further includes estimating a fair transmission rate and sending the estimated fair transmission rate to an ingress processor of the physical FIFO queue. The ingress processor is configured to prioritize a newly arriving data packet for a given data flow based on a comparison of a determined transmission rate for the data flow and the estimated fair transmission rate. The method of prioritizing includes forwarding the data packet to a priority FIFO queue for transmission.

The method helps in estimating the fair transmission rate that can be used by end systems to perform precise network congestion control. The fair transmission rate can also be used for monitoring or enforcement of fair sharing or load balancing, or as input to resource allocation procedures.

In a ninth possible implementation form of the method of managing data transmission of the fourth possible implementation form or the fifth possible implementation form of the first aspect, the update time interval is an elapsed time interval between receiving a previous data packet and receiving the data packet.

In a tenth possible implementation form of the method of managing data transmission of the first aspect as such or according to any of the preceding implementation forms, the target queue is set based on a fixed order of the list of virtual queues.

In an eleventh possible implementation form of the method of managing data transmission of the first aspect as such or according to any of the first possible implementation form of the method to the ninth possible implementation form of the method of the first aspect, the target queue is set based on a pseudorandom selection from the list of virtual queues.

In a twelfth possible implementation form according to the tenth possible implementation form or the eleventh possible implementation form of the method of managing data transmission of the first aspect, the target queue is set further based on a weighting for each virtual queue on the list of virtual queues. The method enables weighted fair bandwidth sharing in programmable/hardware switches and routers by applying individual flow weights for each virtual queue.

In a thirteenth possible implementation form of the first aspect as such or according to any of the preceding implementation forms of the first aspect, reducing the target queue includes removing the target queue from the list of virtual queues if the target queue is empty.

In a fourteenth possible implementation form of the first aspect as such or according to any of the preceding implementation forms of the first aspect, reducing the credit allowance includes storing a remainder value of the credit allowance if the target queue is empty after reducing the target queue.

In a fifteenth possible implementation form of the first aspect as such or according to any of the preceding implementation forms of the first aspect, the method further includes estimating a fair transmission rate and outputting the fair transmission rate by at least one of: (i) adding the fair transmission rate to a header of the received data packet or (ii) forwarding the fair transmission rate value to an external device. The estimated fair transmission rate optionally helps in determining the appropriate sending rate from data sources/external devices to match the fair transmission rate, so that there is no data packet loss and negligible delay.

According to a second aspect, there is provided a computing device that includes a processor and is configured to execute the method and any one of its preceding implementation forms.

According to a third aspect, there is provided a computer program which, when executed by a processor, causes the processor to execute the method and any one of its preceding implementation forms.

According to a fourth aspect, there is provided a computer-readable medium that includes instructions which, when executed by a processor, cause the processor to execute the method and any one of its preceding implementation forms.

A technical problem is resolved, wherein the technical problem concerns multiple per-flow queues required, complex congestion control protocols, and unsuitability for pipelined data processing of switch architectures.

Therefore, in contradistinction, according to the method, the computing device, the computer program, and the computer-readable medium provided in the present disclosure, a simple computation with a minimum number of virtual queues is sufficient to enforce per-flow fair bandwidth sharing inter-operably at local as well as an end to end data transmission by tracking the occupancies of per-data flow virtual queues realized as a list of virtual queues. A virtual queue from the list of virtual queues is updated on receiving each data packet. First, the amount of service capacity accumulated since receiving the previous data packet is added to the credit allowance. The received data packet is then added to the virtual queue to which the received data packet pertains. Separately, at appropriate time instants that may or may not coincide with the data packet arrivals, the credit allowance is used to reduce the occupancy of the target queue of the one or more data flows that are active.

These and other aspects of the present disclosure will be apparent from and the embodiment(s) described below.

BRIEF DESCRIPTION OF DRAWINGS

Embodiments of the present disclosure will now be described, by way of example only, with reference to the following diagrams.

FIGS. 5A-5B are flow diagrams that illustrate a method of managing data transmission in accordance with an embodiment of the present disclosure.

DETAILED DESCRIPTION

Embodiments of the present disclosure provide a system and method of managing data transmission to ensure per-flow fairness to achieve congestion control of bandwidth in a network. The system and method for measuring, forwarding, and enforcing per-flow fairness can be implemented at (i) a local level in a single device, (ii) an end-to-end (i.e. data flow) level, or (iii) a global level (i.e. a network level). The local level and the end-to-end (data flow) level are compatible and enforceable together.

To make solutions of the present disclosure more comprehensible for a person skilled in the art, the following embodiments of the present disclosure are described with reference to the accompanying drawings.

Terms such as "a first", "a second", "a third", and "a fourth" (if any) in the summary, claims, and the accompanying drawings of the present disclosure are used to distinguish between similar objects and are not necessarily used to describe a specific sequence or order. It should be understood that the terms so used are interchangeable under appropriate circumstances, so that the embodiments of the present disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units, but may include other steps or units that are not expressly listed or that are inherent to such process, method, product, or device.

A data flow is defined as a sequence of data packets with like header field values occurring locally in time and space. In IP networking, the header fields of a data packet may include the 5-tuple of source and destination addresses, source and destination ports and the transport protocol.

Figure 1:
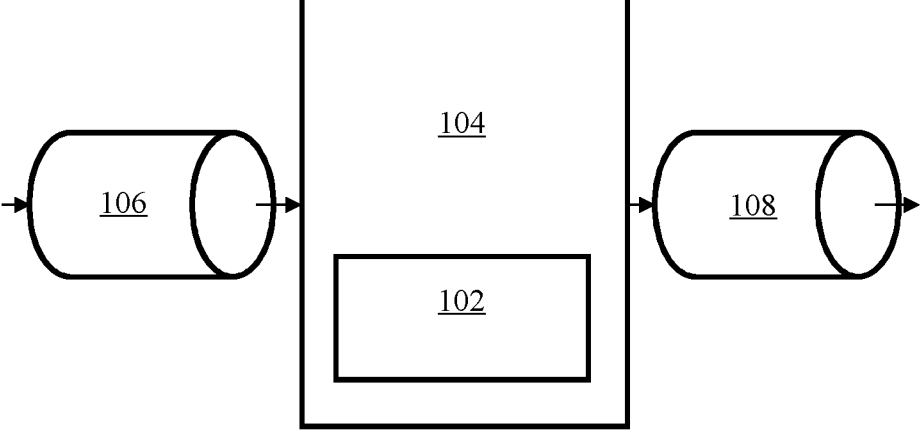
FIG. 1 is a block diagram of a computing device that manages data transmission in accordance with an embodiment of the present disclosure.
Figure 1:

FIG. 1 is a block diagram 100 of a computing device 104 that manages data transmission in accordance with an embodiment of the present disclosure. The computing device 104 includes a processor 102. The processor 102 receives a data packet pertaining to one of one or more data flows. The processor 102 identifies a virtual queue from a list of virtual queues based on a data flow to which the received data packet pertains. The processor 102 determines if the identified virtual queue exceeds a threshold maximum size (θ). Based on an outcome of the determination, the processor 102 increases the identified queue virtual size based on the size of the received data packet and forwards the received data packet. The processor 102 sets a virtual queue from the list of the virtual queues as a target queue. The processor 102 determines a service capacity based on an update time interval, and increases a credit allowance based on the determined service capacity. At a time instant that may or may not coincide with the data packet arrival, the processor 102 reduces the target queue, by an amount based on the credit allowance size, and reduces the credit allowance by the same amount. The computing device 104 optionally includes a data flow input port 106 and an output port 108. The processor 102 receives the data packet pertaining to one of the one or more data flows, from the data flow input port 106. The processor 102 forwards the received data packet through the output port 108.

In an embodiment, the processor 102 does not forward the received data packet and does not increase the identified virtual queue based on the size of the received data packet, if the processor 102 determines that the virtual queue size exceeds the threshold maximum size. The received data packet may be dropped or discarded.

In an embodiment, the computing device 104, without limitation, is selected from a router, a hardware/programmable switch including high speed programmable switch, a tablet, a computer, etc.

Figure 2:
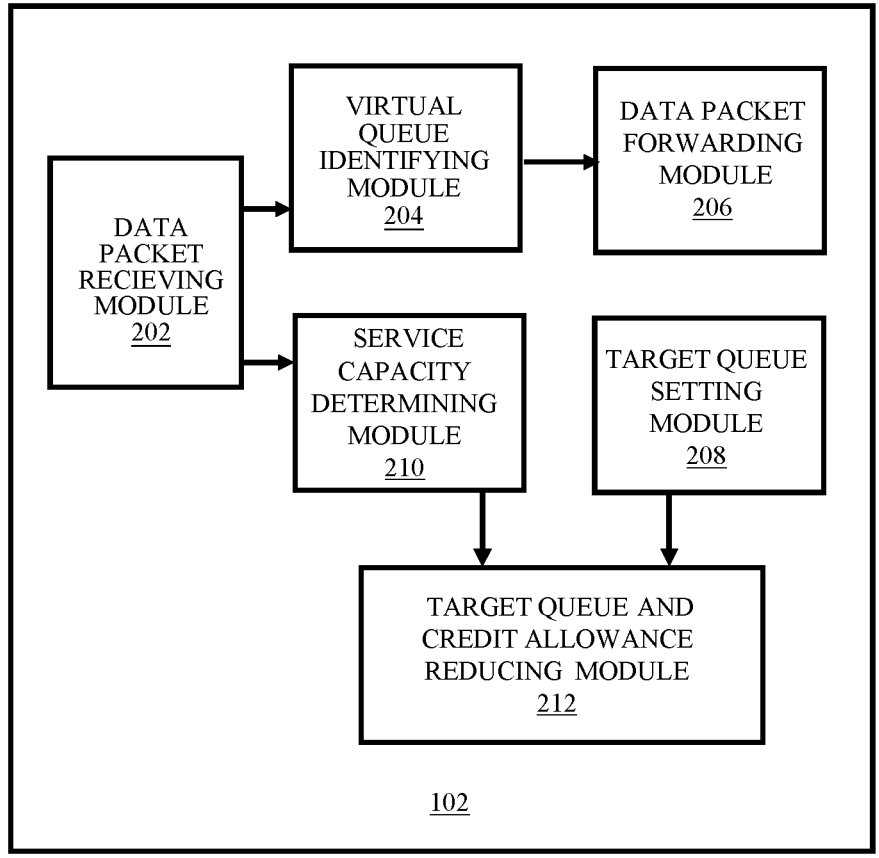
FIG. 2 is an exploded view of the computing device of FIG. 1 in accordance with an embodiment of the present disclosure.

FIG. 2 is an exploded view of the computing device 104 of FIG. 1 in accordance with an embodiment of the present disclosure. The computing device 104 includes a data packet receiving module 202, a virtual queue identifying module 204, a data packet forwarding module 206, a target queue setting module 208, a service capacity determining module 210, and a target queue and credit allowance reducing module 212. The data packet receiving module 202 receives a data packet pertaining to one of one or more data flows. The virtual queue identifying module 204 identifies a virtual queue from a list of virtual queues based on the data flow to which the received data packet pertains. The data packet forwarding module 206 determines whether the identified virtual queue size exceeds a threshold maximum size. Based on an outcome of the determination, the data packet forwarding module 206 increases the identified virtual queue based on a size of the received data packet and forwards the received data packet.

The service capacity determining module 210 is activated on receiving of the data packet at the data packet receiving module 202 and determines a service capacity based on an update time interval and increases a credit allowance based on the determined service capacity.

In an embodiment, the data packet forwarding module 206 does not forward the received data packet and does not increase the identified virtual queue based on the size of the received data packet, if the data packet forwarding module 206 determines that the virtual queue size exceeds the threshold maximum size. The received data packet may be dropped or discarded, rather than being forwarded.

The target queue setting module 208 sets a virtual queue from the list of virtual queues as a target queue. The target queue and credit allowance reducing module 212 reduces the target queue by an amount based on the credit allowance size and reduces the credit allowance by the same amount. The target queue is reduced at appropriate time instants that may occur at least as frequently as the data packet arrivals but may or may not coincide with the data packet arrivals.

Figure 3A:
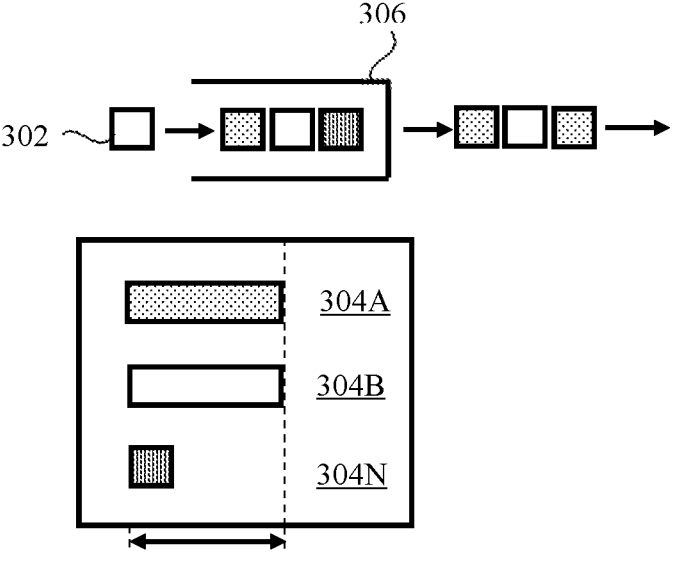
FIG. 3A is an exemplary illustration of a method of updating each arrival of a data packet in a virtual queue from a list of virtual queues and forwarding the received data packet through a FIFO queue to the output port of FIG. 1 in accordance with an embodiment of the present disclosure.

FIG. 3A is an exemplary illustration of a method of updating each arrival of a data packet 302 in a virtual queue from a list of virtual queues and forwarding the received data packet 302 through a FIFO queue 306 to the output port 108 of FIG. 1 in accordance with an embodiment of the present disclosure. First, a virtual queue is identified from a list of virtual queues 304A-N based on a data flow to which the received data packet 302 pertains. It is determined whether the identified virtual queue size exceeds a threshold maximum size. Based on an outcome of the determination, the identified virtual queue is increased based on the size of the received data packet 302.

The received data packet 302 is forwarded through the FIFO queue 306 for transmission if the identified virtual queue size does not exceed the threshold minimum size. The received data packet 302 is then added to the virtual queue to which the received data packet 302 pertains.

A service capacity is determined based on the update time interval and the credit allowance is increased based on the determined service capacity. First, the amount of service capacity accumulated since receiving the previous data packet is added to the credit allowance.

Separately, at appropriate time instants that may or may not coincide with the data packet arrivals, the credit allowance is used to reduce the occupancy of the target queue of the one or more data flows that are active. The appropriate time instants may occur at least as frequently as the data packet arrivals but are otherwise freely defined and may or may not coincide with the data packet arrivals.

Figure 3B:
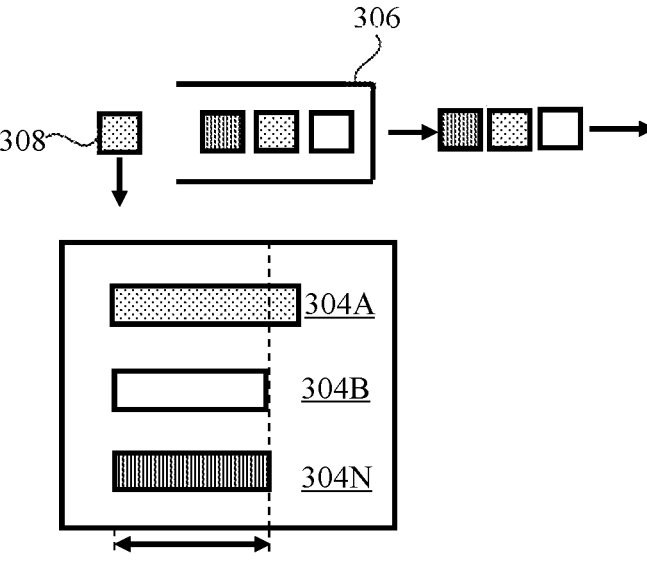
FIG. 3B is an exemplary illustration of a method of updating each arrival of a data packet in a virtual queue from a list of virtual queues and not forwarding the received data packet when the virtual queue size is more than the threshold minimum size, in accordance with an embodiment of the present disclosure.

With reference to FIG. 3A, FIG. 3B is an exemplary illustration of a method of updating each arrival of a data packet 308 in a virtual queue from a list of virtual queues and not forwarding the received data packet 308 through the FIFO queue 306 when the virtual queue size exceeds the threshold minimum size, in accordance with an embodiment of the present disclosure. The received data packet 308 is optionally dropped if the identified virtual queue 304A size exceeds the threshold minimum size. Optionally, a notification of network congestion may be added to a header of the received data packet 308 before the received data packet 308 is forwarded, if it is determined that the virtual queue size exceeds the threshold maximum size.

The method is realized for enforcing approximate per-flow fair bandwidth sharing in switches and routers, which may use a singular physical queue per the output port 108.

The method reduces the backlog of one virtual queue, that is the target queue, at appropriate time instants. The appropriate time instants may or may not coincide with the data packet arrivals. If the target queue has a backlog service capacity smaller than credit service capacity, the target queue may be removed from the list of virtual queues 304A-N. A residual credit may be retained and may be added to newly accumulated service capacity on the next arrival of a data packet. The method is executed at a local level and an end-to-end level using a first algorithm and a second algorithm respectively for managing the data transmission.

Figure 4:
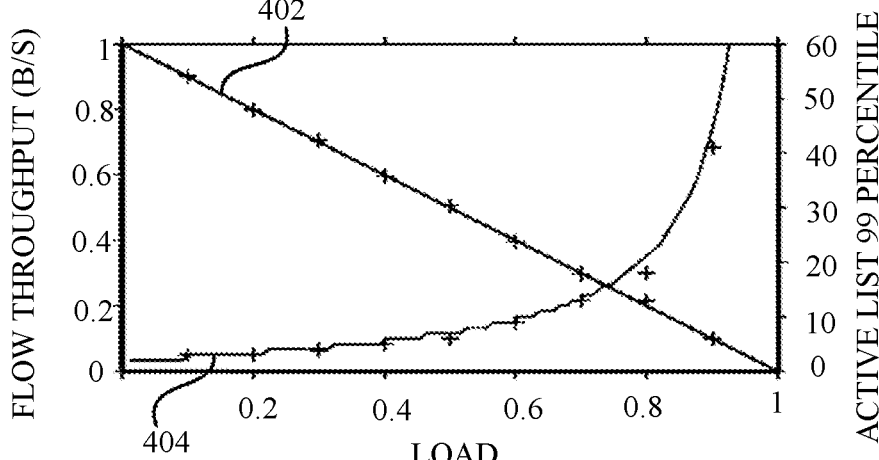
FIG. 4 is a graphical representation that illustrates a mean flow throughput and 99 percentile of a list of virtual queues size in accordance with an embodiment of the present disclosure.

FIG. 4 is a graphical representation that illustrates a mean flow throughput and 99 percentile of a list of virtual queues size in accordance with an embodiment of the present disclosure. The graphical representation depicts the mean flow throughput and the 99 percentile of the list of virtual queues size of approximate fairness. The load is plotted on an X-axis, and the mean flow throughput 402 or 99 percentile 404 of the list of virtual queues size is plotted on a Y-axis. The graphical representation depicts results of a simulation of the present method (+) and analytical model (lines). The present method enforces fairness at a coarse granularity, comparable to that realized by classical schedulers such as DRR.

Figure 5B:
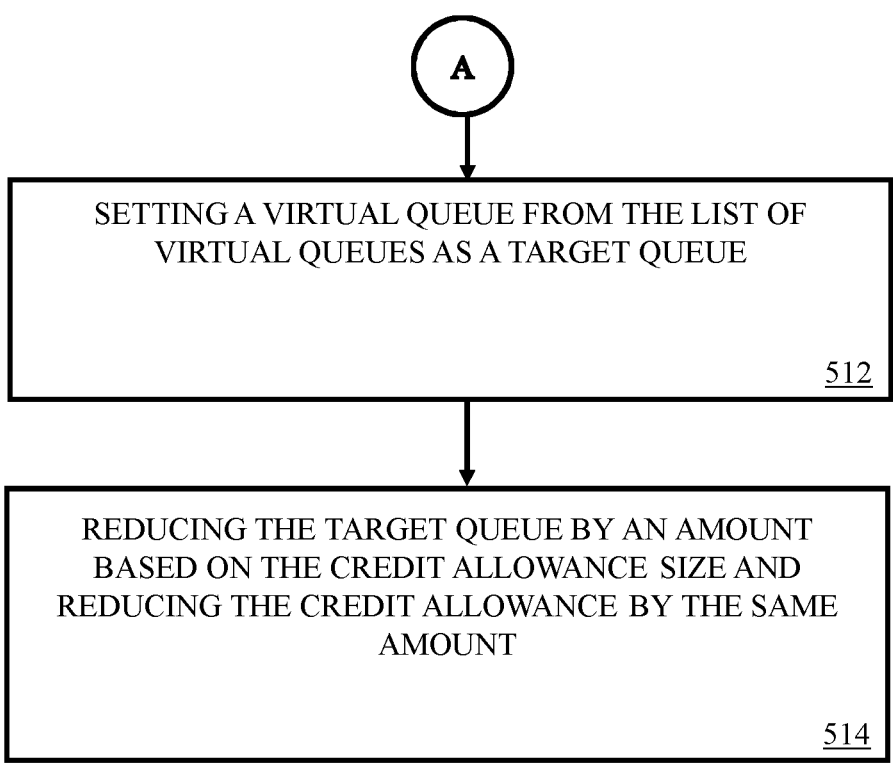

FIGS. 5A-B are flow diagrams that illustrate a method of managing data transmission in accordance with an embodiment of the present disclosure. At a step 502, a data packet pertaining to one of one or more data flows is received by a processor. At a step 504, a virtual queue from a list of virtual queues is identified, by the processor, based on the data flow to which the received data packet pertains. At a step 506, it is determined whether the identified virtual queue size exceeds a threshold maximum size by the processor. At a step 508, based on an outcome of the determination, the identified virtual queue is increased based on a size of the received data packet and the received data packet is forwarded. At a step 510, a service capacity is determined based on an update time interval, and a credit allowance is increased based on the determined service capacity by the processor.

At a step 512, a virtual queue from the list of virtual queues is set as a target queue by the processor. At a step 514, the target queue is reduced by an amount based on the credit allowance size, and the credit allowance is reduced by the same amount by the processor.

According to a first embodiment, the received data packet is not forwarded and the identified virtual queue is not increased based on the size of the received data packet, if it is determined that the virtual queue size exceeds the threshold maximum size. The second algorithm processes the received data packet. The second algorithm drops the received data packet if the second algorithm determines that the virtual queue size exceeds the threshold maximum size. In an embodiment, if the virtual queue (VQ) is incremented by received data packet length, the second algorithm forwards the received data packet.

According to a second embodiment, a notification of network congestion is added to a header of the received data packet before the received data packet is forwarded, if it is determined that the virtual queue size exceeds the threshold maximum size. Optionally, the virtual queue is identified by adding a new virtual queue to the list of virtual queues, if the list of virtual queues does not include a virtual queue corresponding to the data flow to which the received data packet corresponds. The received data packet is optionally forwarded to a physical FIFO queue for transmission. The received data packet is optionally forwarded by determining whether the identified virtual queue size exceeds a threshold minimum size, and forwarding the data packet to a priority FIFO queue for transmission if the identified virtual queue size does not exceed the threshold minimum size. The data packet is optionally received from a physical FIFO queue, and the received data packet is optionally forwarded to an output port for transmission.

According to a third embodiment, the update time interval is an elapsed time interval between a timestamp of a previous data packet and a timestamp of the data packet. The timestamps of the data packets are based on a respective time of ingress into the physical FIFO queue that precedes the computing device 104.

Optionally, the method includes estimating a fair transmission rate and sending the estimated fair transmission rate to an ingress processor of the physical FIFO queue. The ingress processor is configured to prioritize a newly arriving data packet for a given data flow based on a comparison of a determined transmission rate for the data flow and the estimated fair transmission rate, wherein prioritizing includes forwarding the data packet to a priority FIFO queue for transmission.

The update time interval is optionally an elapsed time interval between receiving a previous data packet and receiving the data packet.

According to a fourth embodiment, the target queue is set based on a fixed order of the list of virtual queues. Optionally, the target queue is set based on a pseudorandom selection from the list of virtual queues. Optionally, the target queue is set further based on a weighting for each virtual queue on the list of virtual queues. Optionally, reducing the target queue includes removing the target queue from the list of virtual queues if the target queue is empty.

According to a fifth embodiment, the credit allowance is reduced by storing a remainder value of the credit allowance if the target queue is empty after reducing the target queue.

According to a sixth embodiment, the method includes estimating a fair transmission rate and outputting the fair transmission rate by at least one of: (i) adding the fair transmission rate to a header of the received data packet or (ii) exporting the fair transmission rate value to an external device.

The method can be implemented at (i) a local level (e.g. in a single device), (ii) an end-to-end (i.e. data flow) level, or (iii) a global level (i.e. a network level). In an embodiment, the method can be implemented at the local level based on dropping data packets of data flows sending in excess of their fair transmission rate. In an embodiment, the method can be implemented in the end-to-end level by altering the behaviour of senders of data flows in excess of their fair transmission rate. In an embodiment, the method can be implemented at the global level that involves altering a network configuration to achieve a target fair transmission rate.

The method enables the enforcement of approximate fair bandwidth sharing by dropping the data packets and is interoperable (i.e. can be used in conjunction) with end-to-end methods tailored for cooperative sources with implicit or explicit signalling, or non-cooperative sources with either local or remote enforcement if the method is implemented in the local level. At the local level, the method limits an amount of data flow that needs to be updated at each new arrival of the data packet for enforcing the fair bandwidth sharing. At the local level, the method enables to update a minimum possible amount of state, i.e., a single data flow. At the local level, the method measures and enforces a fair transmission rate that is collocated at a device scheduler. At the local level, the enforcement of fair bandwidth sharing is realized using an active queue management (e.g., dropping of the data packets). In the local level, signalling of the fair transmission rate can be performed using an Explicit Congestion Notification (ECN) field or by resetting a rwnd field of IP or adding the fair transmission rate estimate to packet headers (e.g., for RDMA data center networks).

At the end-to-end level, the measurement of the fair transmission rate is performed at a device. In an embodiment, the method uses a same algorithm (e.g. the first algorithm and the second algorithm) for the measurement of the fair transmission rate which is used at the local level. In the end-to-end level, the enforcement of the fair bandwidth sharing is performed by at least one of (i) a host for a case of a cooperative source (e.g., reacting to ECN marking of the data packet) or (ii) a device for a non-cooperative source (e.g., rewriting the rwnd field in a packet header of ACK packets).

At the global level, the measurement of the fair transmission rate is performed at multiple devices and is collected at a central point. At the global level, the enforcement of fair bandwidth sharing is global, realized through a centralized controller, e.g., a software-defined networking (SDN) controller, or a Path Computation Element (PCE). At the global level, an export of the data is considered, as fair transmission rate statistics are input to a controller (e.g. as utility function or constraint). The method can reduce problems by managing resource utilization globally, e.g. reducing unfairness by assigning one or more "alike data flows" to the same paths.

In an embodiment, the method uses a first algorithm and a second algorithm at the local level. The first algorithm reduces the size of the virtual queue (VQ) from the list of the virtual queues while the second algorithm processes a received data packet and shows additional steps needed beyond a traditional forwarding function, e.g. drop or export.

The virtual queue (VQ) to be reduced in the first algorithm is a target queue, e.g., at the head of a linked list of the virtual queues. If the virtual queue (VQ) has a backlog smaller than credit, the virtual queue (VQ) is removed from a set B and the associated linked list of the virtual queues. In an embodiment, a residual credit is retained and added to a newly accumulated service capacity on the next execution. The head of the linked list may be incremented cyclically on each execution. The first and second algorithms avoid division and loops and can be implemented in programmable switches (P4). The method achieves approximate fair bandwidth sharing and is intended to be applied in programmable switches with a limited computing capacity.

If the first algorithm is executed sufficiently often, the data flow backlogs are reduced fairly. Applying the first and second algorithms is asymptotically fair for any set of permanently backlogged data flows. The first and second algorithms may be considered to provide the same fairness guarantees as provided by classical fair queuing schedulers such as DRR. In one embodiment, the first algorithm and the second algorithm are executed in a P4 pipelined architecture (such as portable switch architecture (PSA)).

In an embodiment, the method is implemented at the local level, using the first algorithm, and the second algorithm achieves an approximate and implementable fair bandwidth sharing via. virtual queues, which can be further enhanced with (i) weighted fairness and (ii) reduced latency. The method provides a tunable method for weighted fairness or provides significant gains by reducing latency.

The method may perform weighted fair sharing by including a data flow multiple times in a linked list of backlogged data flows, with an applied multiple corresponding to weight. Optionally, the target queue to be reduced on one algorithm cycle can be randomly selected from the set B, where the probability that a data flow is selected is set proportional to its weight. In an embodiment, the weight to be applied is determined from a flow identifier or any other packet header fields.

In an embodiment, the method uses a virtual scheduler system to use a physical priority queue in addition to the FIFO to achieve reduced latency. The received data packets for the data flows that are not currently in the list of backlogged data flows are sent to a priority queue. This ensures that data packets that belong to low rate streaming flows or single data packet queries have low latency without unduly impacting the throughput of the backlogged data flows.

In an embodiment, an implementation target of the local level (the first algorithm and the second algorithm) is the PSA, as defined by the P4 Consortium. 'Ingress' and 'Egress' represent two independent pipelines of match-action stages, each of which can perform a limited number of operations on each processing cycle (e.g., a cycle rate of 1 gigahertz (GHz)). The ingress and egress pipelines handle the data packets from a group of input ports and destined to a group of output ports, respectively.

In an embodiment, one stage in the egress pipeline may maintain a state needed for the first algorithm and the second algorithm for the list of virtual queues. The state for each virtual queue is distinct which allows parallel contemporary execution for each output port. The first algorithm can be executed at each pipeline cycle for each output port that does not have an arriving data packet. If the pipeline cycle corresponds to a data packet arrival for an output port, the pipeline stage may execute the second algorithm for this output port.

In an embodiment, the credit allowance is incremented based on the difference between time stamps of successive packet arrivals. These time stamps record the time the packets are placed in the queue by the ingress pipeline.

The first algorithm and the second algorithm may perform operations such as reading, updating, and writing a small number of registers, and may be performed within the time limit of one cycle (e.g. 1 nanosecond (ns)). In an embodiment, parallelization of the operations that rely on distinct state data is a feature of the programmable switches (P4). For implementation in PSA, the second algorithm employs a condition test (if-then-else) and then a comparison (>threshold) or an increment of a single state (flow.vq).

In an embodiment, the method includes an ingress list that records an arrival time of the data packet that is received and the size of the data packet. The data flow may be forwarded based on a comparison of the data flow rate (=last arriving data packet size/(present time-last arriving data packet arrival time)) with the current fair transmission rate at an update time interval. The ingress pipeline time stamps the data packets as they are enqueued at the FIFO queue for forwarding. The ingress list allows the reduced latency enhancement. The received data packets may be forwarded to a priority queue if their data flow is absent from the list or if the time since the last arrival is greater than a threshold time depending on the current estimated fair transmission rate.

In the end-to-end level, the method uses a third algorithm and a fourth algorithm. In the end-to-end level, the method covers a full taxonomy of (i) implicit signalling (ECN marking) and explicit signalling (fair transmission rate export) in cooperative sources and (ii) local action, remote enforcing (header rewriting), and local action and enforcing (scheduler drop decisions) in non-cooperative sources.

In an embodiment, if protocol redesign is not possible (e.g., TCP/IP Internet), the ECN is exploited for efficient operation. The ECN allows end-to-end notification of network congestion without dropping the data packets, by explicitly setting bits in a TCP/IP header (i.e., piggybacking a signal on data traffic). Instead of dropping the data packets that are received when the virtual queue (VQ) length is greater than the threshold maximum size, the method sets one ECN bit of such data packets to 1. This allows in-band data plane signalling without a need for explicit fair transmission rate export, delegating enforcement to the source.

In the explicit signalling (fair transmission rate export), the method forwards fair transmission rate information for walled-garden scenarios, where there is freedom of protocol redesign (e.g. datacentre/RDMA), by (a) a local device that adds fields to a packet header that enables computation of the fair transmission rate (i.e. data plane signalling) and by signalling a current fair transmission rate, or (b) a dedicated control protocol i.e. control plane signalling, exporting the fair transmission rate at configurable time intervals.

In the end-to-end method with remote enforcing (header rewriting), the non-cooperative sources can be handled by rewriting the rwnd header field for out-of-profile flows. The rwnd header field is set as a function of the fair transmission rate (i.e. exporting the approximate fair transmission rate in the data plane). In the local method with enforcing (scheduler drop decisions), a second, higher threshold $\theta'>\theta$ is applied, to retain robustness to the non-responsive data flow in presence of a mixture of data flows. If the virtual queue pertaining to the data flow has size$>\theta$, the data packet may receive an ECN mark. If the virtual queue pertaining to the data flow has size$>\theta'$ with $\theta<\theta'$, the received data packet is not forwarded or is dropped to retain robustness at the end-to-end level in case of non-responsive flows.

The first algorithm for reduction of one virtual queue is as follows:

State variables used: C—service rate. B—set of backlogged flows, linked list of members of B starting with head (B), credit—credit allowance.
flow=head(B)
if credit<flow.vq then
flow.vq−=credit
credit=0
else
credit−=flow.vq
B=B\flow
end if
if |B|>0 then
head(B)=next
end if The second algorithm related to data packet forwarding with dropping is as follows:

State variables used: C—service rate. B—set of backlogged flows, a linked list of members of B, $\theta$—a threshold, tlast—time of last update, credit-credit allowance.
time( )—packet arrival time. In one embodiment, time(0) is the current processor clock time. In another embodiment, it is the value of a time stamp previously set in the packet metadata.
input pkt
credit+=C×(time( )−tlast)
tlast=time( )
if flow(pkt)∈B then
if flow.vq>θ then
drop packet
else
flow.vq+=packet.length
end if
else
B=B∪flow
flow.vq=packet.length
add flow to tail of linked list
end if
if export then return fair rate estimate, eg. C/|B|
end if
The third algorithm is as follows:
State variables used: C—service rate. B—set of backlogged data flows, linked list of members of B, $\theta$, $\theta'$—thresholds ($\theta<\theta'$), tlast—time of last update, credit—credit allowance, time( )—packet arrival time.
input pkt
credit+=C×(time( )−tlast)
tlast=time( )
if flow(pkt)∈B then
if flow.vq>θ' then
drop packet
else
if flow.vq>θ then
set ECN bit in header
end if
flow.vq+=packet.length
end if
else
B=B∪flow
flow.vq=packet.length
add flow to tail of linked list
end if
if export then
return fair rate estimate, eg. C/|B|
end if In an alternative embodiment, the virtual queue size is increased based on the data packet length and then the increased virtual queue size is compared to the threshold to determine whether or not to drop the packet.

The fourth algorithm that realizes data packet forwarding with ECN and rwnd reset is as follows:

State variables used: C—service rate. B—set of backlogged flows, a linked list of members of B, $\theta$, $\theta'$—thresholds ($\theta<\theta'$), tlast—time of last update, credit—credit allowance, time( )—packet arrival time, RTT—RTT estimate.
input pkt
credit+=C×(time( )−tlast)
tlast=time( )
if flow (pkt)∈B then
if flow.vq>θ' then
reset rwnd using fair rate estimate
eg, rwnd=C/|B|×RTT
else
if flow.vq>θ then
set ECN bit in header
end if
flow.vq+=packet.length
end if
else
B=B∪flow
flow.vq=packet.length
add flow to tail of linked list
end if
if export then
return fair rate estimate, eg. C/|B|
end if The method may be used in Internet routers to enforce fair sharing when some data flows emit data packets at a rate that saturates the bandwidth. The method may also be used to enforce fair sharing of link capacity in a datacentre network. The algorithms can be implemented, in particular, in servers for data flows in a direction of server to ToR switch and in ToR switches for the data flows in a direction of ToR to server. The method is used to improve performance of a lossless RDMA data center network. The second algorithm provides an estimate of the current fair transmission rate and this can be used to determine an appropriate source transmission rate (i.e. fair rate). If sources pace data packet emissions to the fair transmission rate, there is no packet loss and negligible delay.

Figure 6:
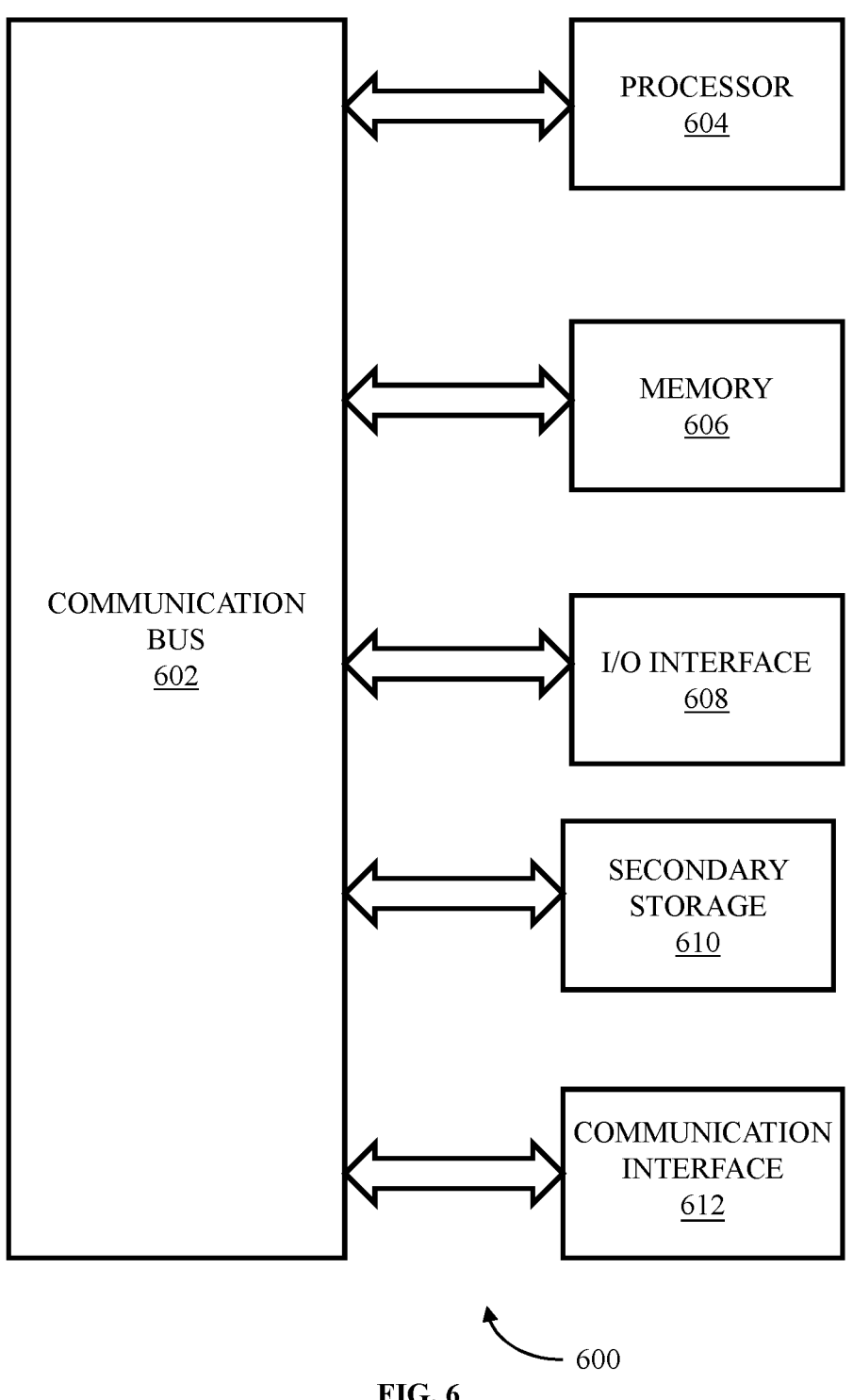
FIG. 6 is an illustration of a computing device for use in implementing embodiments of the present disclosure.

FIG. 6 illustrates an exemplary computing device 600 in which the various architecture and/or functionality of the various previous embodiments may be implemented. As shown, the computing device 600 is provided including at least one processor 604 that is connected to a bus 602, wherein the computing device 600 may be implemented using any suitable protocol, such as Peripheral Component Interconnect (PCI), PCI-Express (PCIE), Accelerated Graphics Port (AGP), HyperTransport, or any other bus or point-to-point communication protocol(s). The computing device 600 also includes a data memory 606.

Control logic (software) and data are stored in the memory 606 which may take the form of random-access memory (RAM). In the present description, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional CPU and bus implementation. Of course, the various modules may also be situated separately or in various combinations of semiconductor platforms per the desires of the user.

The computing device 600 may also include a secondary storage 610. The secondary storage 610 includes, for example, a hard disk drive a removable storage drive, representing a floppy disk drive, a magnetic tape drive, a compact disk drive, digital versatile disc (DVD) drive, recording device, Universal Serial Bus (USB) flash memory. The removable storage drive at least one of reads from and writes to a removable storage unit in a well-known manner.

Computer programs, or computer control logic algorithms, may be stored in the memory 606 and/or the secondary storage 610. Such computer programs, when executed, enable the system 600 to perform various functions. The memory 606, the secondary storage 610, and/or any other storage are possible examples of computer-readable media.

In an embodiment, the architecture and functionality of the various previous figures may be implemented in the context of the processor 604, a graphics processor coupled to a communication interface 612, an integrated circuit (not shown) that is capable of at least a portion of the capabilities of both the processor 604 and a graphics processor, a chipset (i.e., a group of integrated circuits designed to work and sold as a unit for performing related functions, etc.), and/or any other integrated circuit for that matter.

Still yet, the architecture and functionality of the various previous figures may be implemented in the context of a general computer system, a circuit board system, a game console system dedicated for entertainment purposes, an application-specific system, and/or any other desired system. For example, the computing device 600 may take the form of a desktop computer, laptop computer, server, workstation, game consoles, embedded system, and/or any other type of logic.

Still yet, the computing device 600 may take the form of various other devices including, but not limited to a personal digital assistant (PDA) device, a mobile phone device, a television, etc. Further, while not shown, the computing device 600 may be coupled to a network (e.g., a telecommunications network, local area network (LAN), wireless network, wide area network (WAN) such as the Internet, peer-to-peer network, cable network, or the like) for communication purposes through an input/output (I/O) interface 608.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present disclosure and its advantages have been described in detail, it should be understood that various changes, substitutions and alterations can be made herein without departing from the spirit and scope of the disclosure as defined by the appended claims.

The invention claimed is:

1. A method implemented by a processor, wherein the method comprises:
   receiving, from a physical first in, first out (FIFO) queue, a data packet pertaining to a first data flow of a plurality of data flows;
   identifying a first virtual queue from a list of virtual queues based on the first data flow;
   determining whether a first size of the first virtual queue exceeds a threshold maximum size;
   when the first size does not exceed the threshold maximum size:
   increasing the first size based on a second size of the data packet; and
   forwarding the data packet;
   setting a second virtual queue from the list as a target queue;
   determining a service capacity based on an update time interval, wherein the update time interval comprises an elapsed time interval between receiving a previous data packet and receiving the data packet;
   increasing a credit allowance based on the service capacity;
   reducing a third size of the target queue by an amount based on the credit allowance; and
   reducing the credit allowance by the amount.

2. The method of claim 1, wherein when the first size exceeds the threshold maximum size, the method further comprises:
   avoiding forwarding the data packet;
   avoiding increasing the first size; and
   discarding the data packet.

3. The method of claim 1, wherein when the first size exceeds the threshold maximum size, the method further comprises adding, before forwarding the data packet, a notification of network congestion to a header of the data packet.

4. The method of claim 1, further comprising:
determining that the list does not comprise the first virtual queue; and
adding, in response to determining that the list does not comprise the first virtual queue, a new virtual queue to the list as the first virtual queue.

5. The method of claim 1, wherein forwarding the data packet comprises forwarding the data packet to the physical FIFO queue for transmission.

6. The method of claim 1, further comprising:
determining whether the first size exceeds a threshold minimum size; and
further forwarding the data packet to a priority FIFO queue for transmission when the first size does not exceed the threshold minimum size.

7. The method of claim 1, wherein forwarding the data packet comprises forwarding the data packet to an output port for transmission.

8. The method of claim 7, further comprising:
estimating a fair transmission rate; and
sending the fair transmission rate to an ingress processor of the physical FIFO queue that is configured to prioritize a newly arriving data packet for a given data flow based on a comparison of a determined transmission rate for the given data flow to the fair transmission rate.

9. The method of claim 1, wherein the update time interval comprises an elapsed time interval between a first timestamp of a previous data packet and a second timestamp of the data packet, and wherein first timestamp and the second timestamp are based on a respective time of ingress into the physical FIFO queue.

10. The method of claim 1, further comprising further setting the target queue based on a fixed order of the list.

11. The method of claim 1, further comprising further setting the target queue based on a pseudorandom selection from the list.

12. The method of claim 11, further comprising further setting the target queue based on a weighting for each virtual queue on the list.

13. The method of claim 1, further comprising:
identifying that the target queue is empty; and
removing, in response to identifying that the target queue is empty, the target queue from the list.

14. The method of claim 1, further comprising:
identifying that the target queue is empty after reducing the third size by the amount; and
storing, in response to identifying that the target queue is empty, a remainder value of the credit allowance.

15. The method of claim 1, further comprising:
estimating a fair transmission rate; and
outputting the fair transmission rate by at least one of:
adding the fair transmission rate to a header of the data packet; or
forwarding the fair transmission rate to an external device.

16. A computing device comprising:
a memory configured to store instructions; and
a processor coupled to the memory and configured to execute the instructions to cause the computing device to:

receive, from a physical first in, first out (FIFO) queue, a data packet pertaining to a first data flow of a plurality of data flows;
identify a first virtual queue from a list of virtual queues based on the first data flow;
determine whether a first size of the first virtual queue exceeds a threshold maximum size;
when the first size does not exceed the threshold maximum size:
increase the first size based on a second size of the data packet; and
forward the data packet;
set a second virtual queue that is other than the first virtual queue from the list as a target queue;
determine a service capacity based on an update time interval, wherein the update time interval comprises an elapsed time interval between receiving a previous data packet and receiving the data packet;
increase a credit allowance based on the service capacity;
reduce a third size of the target queue by an amount based on the credit allowance; and
reduce the credit allowance by the amount.

17. The computing device of claim 16, wherein when the first size exceeds the threshold maximum size, the processor is further configured to execute the instructions to cause the computing device to:
avoid forwarding the data packet;
avoid increasing the first size; and
discard the data packet.

18. The computing device of claim 16, wherein when the first size exceeds the threshold maximum size, the processor is further configured to execute the instructions to cause the computing device to add a notification of network congestion to a header of the data packet.

19. A computer program product comprising computer-executable instructions that are stored on a non-transitory computer-readable medium and that, when executed by a processor, cause a computing device to:
receive, from a physical first in, first out (FIFO) queue, a data packet pertaining to a first data flow of a plurality of data flows;
identify a first virtual queue from a list of virtual queues based on the first data flow;
determine whether a first size of the first virtual queue exceeds a threshold maximum size;
when the first size does not exceed the threshold maximum size:
increase the first size based on a second size of the data packet; and
forward the data packet;
set a second virtual queue that is other than the first virtual queue from the list as a target queue;
determine a service capacity based on an update time interval, wherein the update time interval comprises an elapsed time interval between receiving a previous data packet and receiving the data packet;
increase a credit allowance based on the service capacity;
reduce a third size of the target queue by an amount based on the credit allowance; and
reduce the credit allowance by the amount.

20. The computer program product of claim 19, wherein when the first size exceeds the threshold maximum size, the processor further executes the computer-executable instructions to cause the computing device to add, before forwarding the data packet, a notification of network congestion to a header of the data packet.

* * * * *